Feb. 26, 1935. R. B. FAGEOL 1,992,365
DUAL DRIVE ROAD VEHICLE
Filed Aug. 3, 1929 3 Sheets-Sheet 1
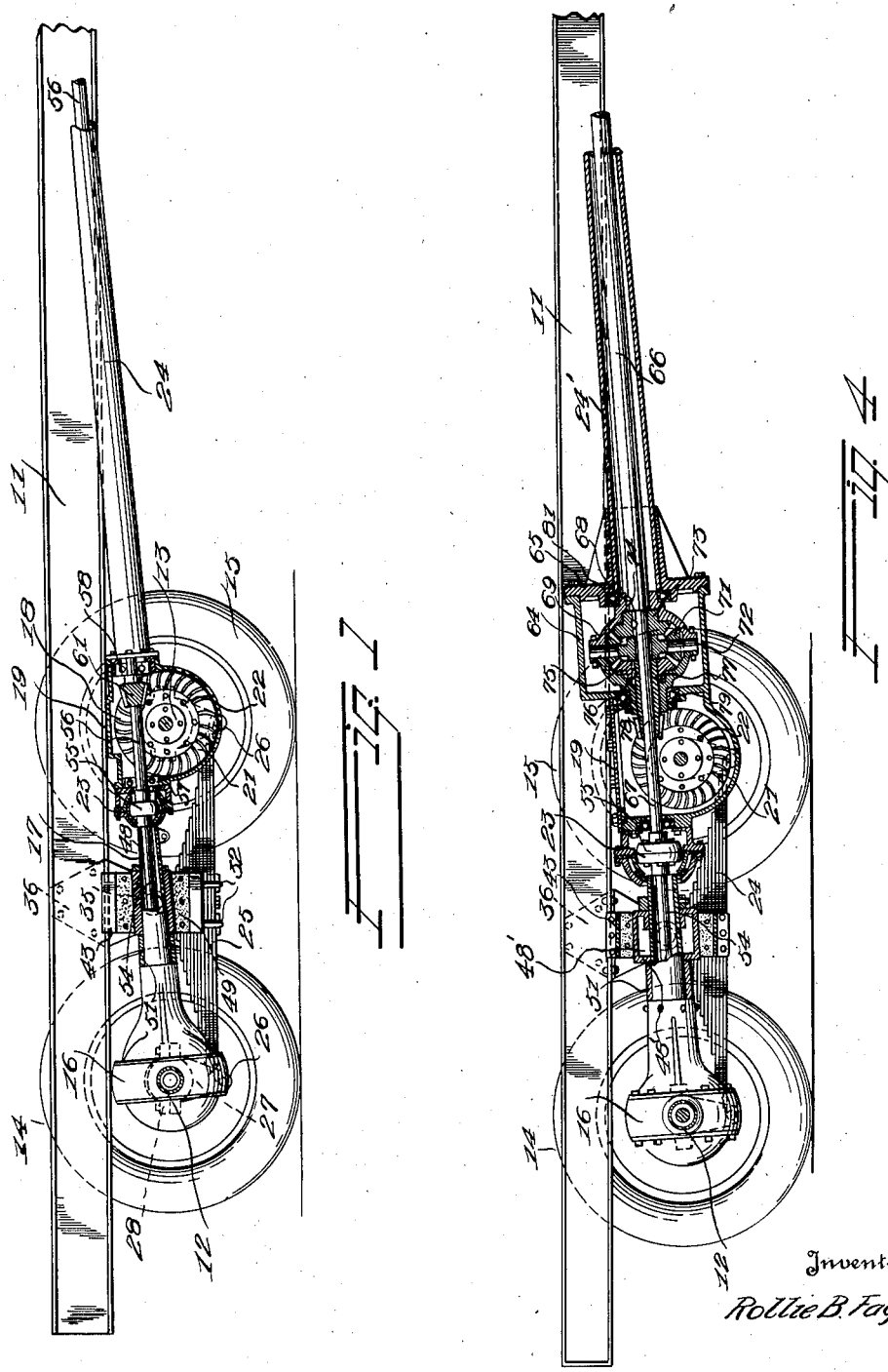
Inventor
Rollie B. Fageol
By Strauch & Hoffman
Attorneys

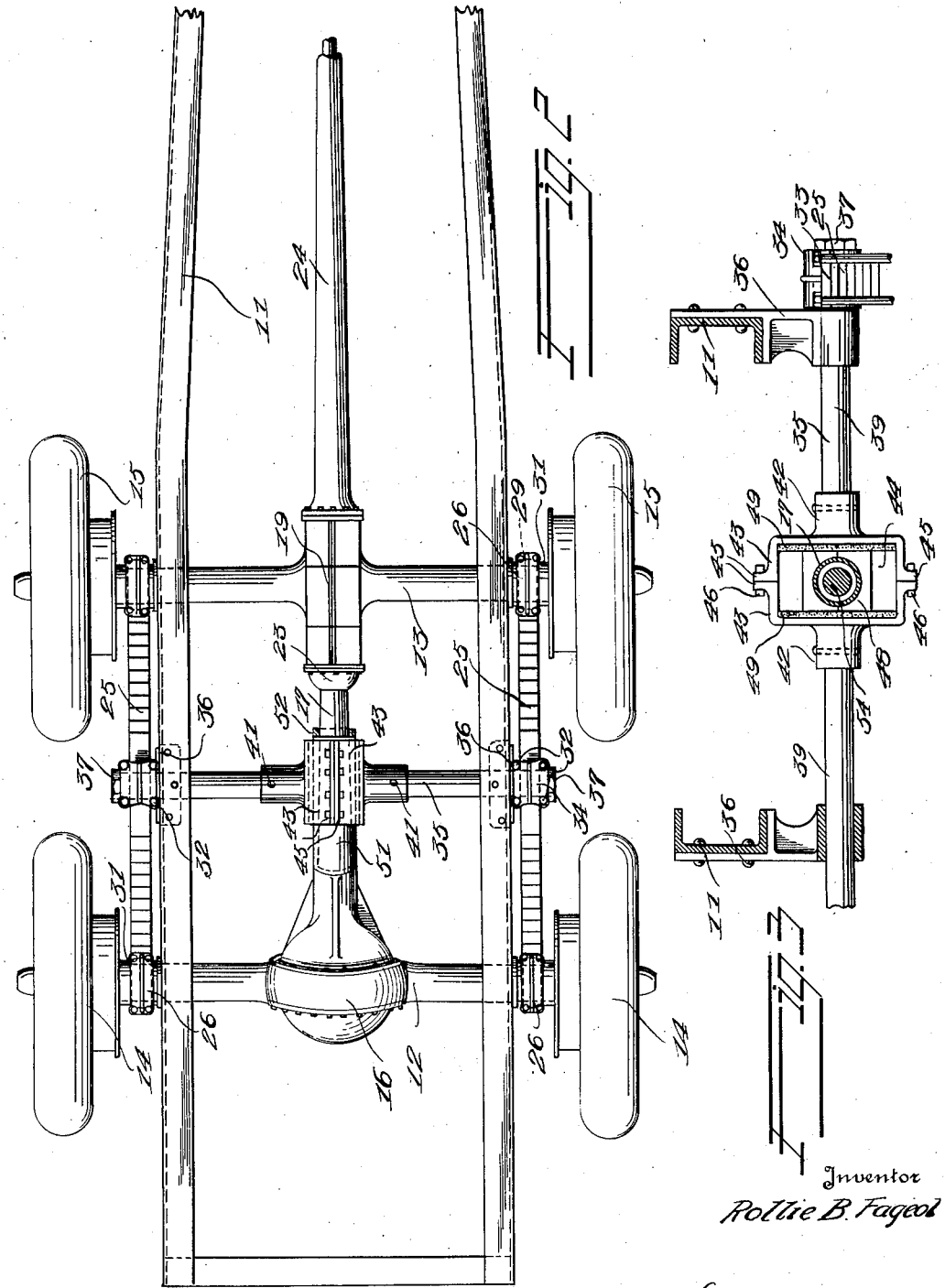

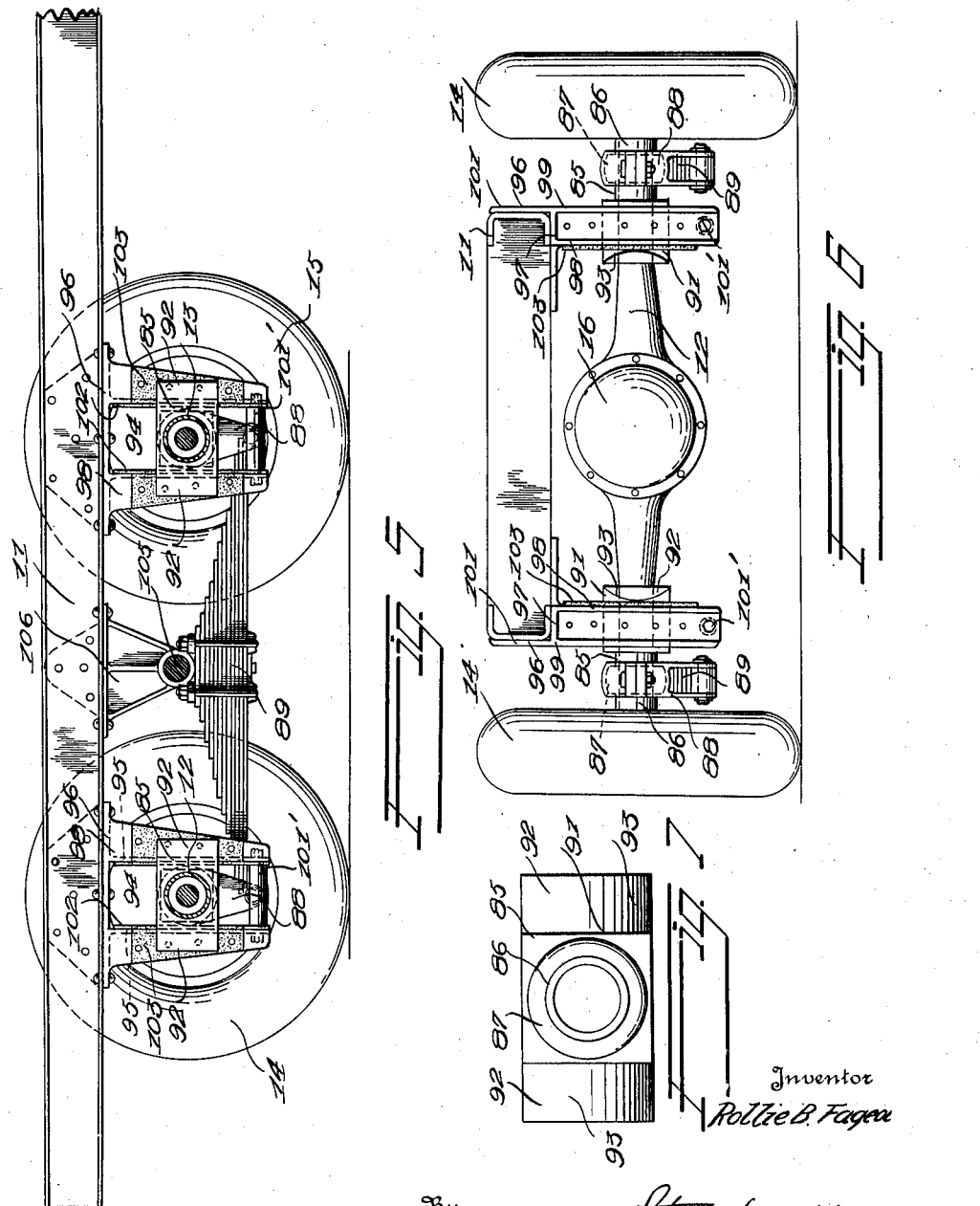

Patented Feb. 26, 1935

1,992,365

UNITED STATES PATENT OFFICE 1,992,365

DUAL DRIVE ROAD VEHICLE

Rollie B. Fageol, Los Angeles, Calif., assignor, by mesne assignments, to Automotive Engineering Corporation, a corporation of Delaware Application August 3, 1929, Serial No. 383,413

16 Claims. (Cl. 180—22)

The present invention relates to a simple drive for a multi-wheel construction.

In addition, the invention relates to multi-wheel vehicles preferably of the dual drive axle type, and in which the driven axles are flexibly connected to the frame permitting each wheel to freely move over road irregularities, while, at the same time, the axles are severally held in definite position endwise of, as well as laterally of the frame.

Drive arrangements for multi-wheel road vehicles embodying a plurality of driven axles that have gone into actual use heretofore have not been entirely satisfactory because the constructions proposed have generally been relatively expensive to manufacture, and in addition introduce factors requiring the use of a discontinuous drive shaft and the shaft sections were caused in operation to assume further varying angular positions as the vehicle moves over road irregularities, introducing relatively large losses of power in the operation of the vehicle and resulting in a destructive "whipping" of the drive shaft sections. This invention aims to produce a drive arrangement for a multi-wheel road vehicle in which a single propeller shaft extends continuously in a substantially straight line from the transmission mechanism of the vehicle to the several axles, under normal conditions and in which the continuous shaft is maintained below the upper edge of the differentials that are individual to the axles, whereby the body floor line may be lowered as well as the center of gravity of the vehicle.

This invention also aims to produce a drive for a multi-wheel road vehicle including a continuously extending drive shaft that is provided with flexible joints that are coincident with the universal joints provided in the torque tubes that position the axles endwise of the frame.

In multi-wheel road vehicle constructions, in which one end of the frame of the vehicle is supported by a plurality of axles, it is desirable that each wheel be free to rise and fall as it moves over road irregularities without restriction, either by the fact that the wheels are connected to axles that are rigidly united together, or by other elements that prevent their relative movement. In some prior proposed constructions the movement of each wheel is restricted because of the fact that it cannot rise and fall without twisting the spring, that may be utilized to yieldingly resist its rising movements. This invention aims to provide a multi-wheel construction in which each wheel is free to move independently of the other wheel that supports the frame end of the vehicle frame without at the same time providing a construction having such a high degree of flexibility that the axles are free to move endwise of the frame or laterally thereof. To this end this invention aims to provide a construction that is extremely flexible, but in which the axles are held in definite spaced relation endwise of the frame as well as laterally thereof so that the axles are always held in proper position without at the same time restricting the flexibility of the construction considered as a whole.

It is accordingly a primary object of the present invention to provide a multi-wheel road vehicle construction of relative simplicity, of maximum flexibility, and which fully overcomes the above specified objections to prior proposed constructions of this general character.

It is a further object of the invention to provide a multi-wheel vehicle construction embodying dual driven axles yieldably connected with the vehicle frame for free swinging movement relative thereto, and a continuous straight line drive for both of said axles.

It is a still further object of the invention to provide a multi-wheel road vehicle comprising tandem drive axles, one of said axles embodying a standard bevel gear drive, the other of said axles embodying a hypoid gear drive, and a straight line through drive shaft operatively associated with said bevel gear and said hypoid gear drives.

It is a still further object of the invention to provide a multi-wheel road vehicle comprising a frame, tandem drive axles, spring assemblies interconnecting said axles, a trunnion shaft supported by said frame, said spring assemblies pivotally connected intermediate their ends to said trunnion shaft, said axles being driven by a straight line thru drive arrangement embodying torque tubes, and means supported by said trunnion shaft and cooperating with one of said torque tubes for maintaining said axles centrally of said frame.

It is a still further object of the invention to provide a multi-wheel road vehicle comprising tandem drive axles, said axles being driven by a straight line through drive arrangement and compensating means for said drive axles.

A still further object of the invention is to provide a multi-wheel road vehicle construction in which each of the axles are positioned endwise of the frame by being connected by means of a universal joint to points on the frame or other axles that are disposed substantially centrally longitudinally of the frame, and in which the movements of the axles are yieldingly resisted by springs that are connected to the axles by hangers that are themselves connected to the axles by universal joints and are flexibly united to the springs so that the movements of the axles are resisted by the springs without causing separational movement of the axles or without substantially interfering with the free deflection of the springs when subjected to substantial stresses.

A still further object of the invention is to provide a multi-wheel road vehicle construction embodying a plurality of drive axles in which the torque tending to rotate the housings of the drive axles is resisted by positioning the axles in guideways depending from the vehicle frame, which guideways are also utilized to prevent lateral movement of the axle with respect to the frame.

It is a still further object of the invention to provide a multi-wheel road vehicle comprising a frame, tandem drive axles, spring means interconnecting said axles and pivotally connected with said frame, and means associated with said drive axles for resisting the driving torque and for simultaneously holding said axles centrally of said frame.

It is a still further object of the invention to provide a multi-wheel road vehicle comprising tandem drive axles, yieldable means interconnecting said axles and pivotally connected with said frame, and means associated with said frame and said axles for resisting the torque on said axles for holding said axles against movement laterally of said frame and for maintaining said axles parallel to each other in definite relation endwise of said frame.

It is a still further object of the invention to provide a multi-wheel road vehicle comprising tandem drive axles, and a straight line through drive arrangement associated with said axles, one of said axles being of standard bevel gear construction, and the other of said axles embodying a hypoid gear drive arrangement constructed for association with standard production axle housings.

It is a still further object of the invention to provide a multi-wheel road vehicle construction of relative simplicity, maximum flexibility, which can be constructed by the utilization of many standard parts thus reducing the expense thereof, and which is adapted to function with a minimum amount of strain and wear on the component parts thereof.

With the above objects in view as well as others that will become apparent during the course of the following disclosure reference will be had to the accompanying drawings forming part of same, and wherein:

Figure 1 is a vertical longitudinal sectional view of the rear end of a vehicle construction in accordance with one of the embodiments of my invention, the section being taken within the near side of the vehicle frame and partially centrally of the drive arrangement for more clearly illustrating the driving and axle centering means.

Figure 2 is a top plan view on a slightly different scale of the construction illustrated in Figure 1.

Figure 3 is a transverse sectional view adjacent the trunnion shaft.

Figure 4 is a view similar to Figure 1 depicting a modified form of the invention.

Figure 5 is a vertical longitudinal sectional view of a still further modified form of the invention, the section being taken within the near side of the vehicle frame and the driving arrangement being omitted for the sake of clearness.

Figure 6 is a rear elevational view of the construction illustrated in Figure 5.

Figure 7 is an elevational view of a combined ball hanger support and axle movement restriction means.

Referring to the drawings by reference characters in which like characters designate like parts and referring first to Figures 1, 2 and 3, 11 designates the vehicle frame which may be of the standard channel beam construction and to which any suitable body is adapted to be secured. The frame 11 is supported at the front end thereof by the usual dirigible wheels and adjacent the rear end thereof is supported by tandem drive axles 12 and 13 provided with the drive wheels 14 and 15 respectively. The drive axle 12, as here illustrated, is a standard Chevrolet bevel gear drive axle, but may obviously be of other standard bevel gear constructions. The axle 12 embodies the differential housing 16 and torque tube 17. The axle 13 is driven by means of a hypoid gear assembly 18, which assembly is mounted in a differential casing 19, the hypoid gear 21 in the gear assembly being connected by the bolts 22 in well known manner to the differential cage, whereby the axle sections of axle 13 are differentially driven in well known manner.

The torque tube 17 above referred to, is connected through a universal joint 23 with the rear end of the differential casing 19. Secured to the forward end of casing 19 is the rear end of a torque tube 24 the forward end of which is provided with a universal joint immediately rearwardly of the transmission in well known manner, the torque tubes 17 and 24 being disposed as is clearly indicated in Figures 1 and 2 co-axial in the normal or non-deflected position of wheels 14 and 15, that is, the axes of tubes 17 and 24 extend in a substantially straight line from rear axle 12 to the transmission of the vehicle.

The axles 12 and 13 are interconnected by leaf spring assemblies 25, which as indicated in Figure 2, are disposed parallel to and immediately outwardly of the opposite side members of frame 11. The opposite ends of springs 25 are connected with axles 12 and 13 in suspended relation thereto by means of ball hangers 26 for universal movement relative to the axles, the hangers 26 embodying body portions 27 and cap portions 28 removably secured to ball seats 29 integrally formed on sleeves 31 mounted on the opposite ends of axles 12 and 13. The intermediate portions of springs 25 are connected by U-bolts 32 to plates 33 provided with pivot eyes 34 which are mounted for pivotal movement on the opposite ends of a trunnion shaft 35 which shaft is supported in brackets 36 secured to frame 11 immediately inwardly of the projecting ends thereof, the eye members 34 being maintained on shaft 35 by nuts 37 engaging the opposite ends of shaft 35.

The trunnion shaft 35, as will be seen from Figure 1, is disposed in intersecting relation to torque tube 17 and the shaft, while serving as a pivot means for springs 25, further serves as a means for restraining lateral movement of torque tube 17, thus holding axles 12 and 13 centrally of frame 11, the shaft 35 being interrupted centrally thereof and provided with means for acomplishing this purpose. To this end, shaft 35 embodies sections 39, the inner ends of which are in spaced relation on opposite sides of tube 17 and secured as by pins 41 to each of the sections 39 is the hub portion 42 of an elongated guide casing section 43, the sections 43 adapted for abutting relation, as indicated in Figure 3 for providing a vertically elongated guide opening 44. The sections 43 are provided with flanges 45 that are utilized to detachably secure them together, bolts 46 for example, being used as the securing means. Thus it will be seen that shaft 35, by the provision of guide sections 43 may be disposed with the axis thereof intersecting tube 17 while sections 43 provide for the vertical oscillation of tube 17 about universal joint 23 occasioned by vertical oscillation of axle 12 responsive to road irregularities.

Disposed about tube 17 is a two part square slide block 48 in which tube 17 is free to rotate, while the block 48 is adapted for vertical movement within opening 44 defined by sections 43. In order to eliminate chatter between tube 17 and sections 43 the opposite lateral faces of said sections, interiorly thereof, are faced with molded brake lining 49 against which the opposite faces of block 48 slide. While other material may be substituted for the brake lining for providing a quiet movement of block 48 within sections 43, the brake lining is preferable due to its ability to successfully withstand any heat generated by friction between the block and the material. In order to position block 48 against longitudinal movement on tube 17, a collar 51 is disposed on tube 17 between block 48 and the forward end of differential housing 16. If desired, however, the housing may be extended, thus eliminating the necessity for collar 51. A second collar 52 is detachably secured to tube 17 forwardly of the block 48 as indicated in Figures 1 and 2 thus holding block 48 in operative position on tube 17.

It will be seen from the foregoing that the axles 12 and 13 are yieldably connected with frame 11 by springs 25 in a manner such that either end of either axle may rise or fall in response to elevations or depressions in the roadway without imposing torsional strains on the springs due to the ball hangers, and due to the pivotal connections of the springs 25 to the frame through shaft 35 both axles 12 and 13 are permitted swinging movement relative to frame 11 whereby one end of either axle is free to rise or fall without deflecting the springs, when the other axle partakes of movement in the opposite rotative direction.

A highly flexible construction is thus provided and by the provision of the guide sections 43 carried by trunnion shaft 35 with block 48 cooperating therewith, the axles 12 and 13 are permitted to oscillate vertically relative to frame 11 while they are held centrally of frame 11, and thus the axles are not subject to being shifted latrally of frame 11 upon rounding curves to cause side thrust on wheels 14 and 15 in spite of their flexible connection to the frame by universal joints and depending arms that permit free spring action and relatively free movement of each wheel with respect to every other wheel.

The differential within housing 16 is driven by the drive shaft 54, provided with a universal joint 55, within the aforementioned joint 23, the universal joint 55 providing a universal connection between shaft 54 and the rear end of a second drive shaft 56 which is disposed co-axially with shaft 54 under normal conditions, and is rotatably mounted in bearings 57 and 58 in casing 19, the shaft 56 extending forwardly from casing 19 through tube 24 to the vehicle transmission adjacent to which it is provided with the usual universal joint concentric with the universal joint for tube 24. The drive arrangement, is as clearly illustrated in Figure 1 composed of shafts 54 and 56 providing a normally straight drive shaft from the rear axle 12 to the vehicle transmission, the shaft 56 extending above the axle sections of axle 13, and provided with a hypoid pinion 61 in driving engagement with the hypoid gear 21 whereby upon rotation of shaft 56 hypoid gear 21 is rotated through pinion 61 which in turn rotates the differential cage within carrier 19 for differentially driving the axle sections in axle 13 and shaft 56 through the universal joint 55 imparts rotation to the aligned drive shaft 54 which drives the standard differential within housing 16 of rear axle 12.

It will accordingly be seen from the foregoing disclosure that a straight line through drive construction is provided for tandem drive axles by the utilization of a standard bevel gear drive axle, and the association therewith of a hypoid gear drive arrangement for differentially driving the drive wheels of the other axle. It will further be seen that the spring suspension for the axles 12 and 13 provides a highly flexible truck construction embodying axles 12 and 13, wherein the axles are permitted free vertical oscillation in response to road irregularities while at the same time the axles are restrained against side or lateral movement relative to the vehicle frame. In all, a multi-wheel road vehicle construction of the tandem drive axle type is provided which is well adapted for road service at high speeds and which is further adapted to be constructed at a relatively low cost. Further due to the straight line drive the drive shaft is subject to minimum wear due to the substantial absence of the common whipping action present in angularly disposed drive shaft arrangements.

While the construction disclosed is particularly adapted to new vehicle constructions it will be obvious that it may be adapted to attachments for already existing single drive axle vehicle constructions for the conversion of same into multiwheel constructions of the tandem drive axle type, since in accordance with the present invention many standard parts such as the rear axle 12, housings for axle 13 together with the drive shafts and torque tubes slightly modified are readily adapted to the construction.

In Figure 4 is disclosed a modified embodiment of my invention which is substantially the same as the construction above disclosed, but is provided with a compensating drive arrangement for axles 12 and 13, the axles 12 and 13 being individually differentially driven in the manner above disclosed through the standard rear differential 16 and the differential carried by the hypoid gear 21. It will be noted further that the guide for torque tube 17 is slightly modified in this form of the invention, the solid block 48 being replaced by a hollow block 48'.

In accordance with this form of the invention the differential casing 19 is forwardly extended to provide a casing 64 provided with a forwardly disposed cap 65, with which cap the rear end of torque tube 24' is secured. The drive shaft 56 in accordance with this form of the invention embodies a forward section 66 and a rearward reduced section 67, which, as in the first form of the invention, is flexibly connected with shaft 54 through the universal joint 55. Shaft section 66 is keyed as indicated at 68 to a differential cage 69 provided with the usual differential pinions 71 rotatably mounted on the radial spindles 72. The pinions 71 cooperate differentially with a bevel gear 73 keyed, as indicated at 74, to the shaft section 67 for operating the rear differential 16 and with a second bevel gear 75 keyed, as indicated at 76, to a sleeve 77 rotatably journaled to shaft section 67 and provided with a hypoid pinion 78 corresponding to pinion 61 for driving hypoid gear 21, which, as in the first form of the invention, drives a differential cage for differentially driving the axle sections of axle 13. The differential cage 69 is rotatably journaled within casing 64 and cap 65 by bearings 79 and 81 respectively.

In accordance with this form of the invention a multi-wheel vehicle construction is provided which embodies tandem driven axles which are yieldably connected with the vehicle frame in the manner above disclosed for providing maximum flexibility and in which the driven axles are driven by a straight line through drive shaft having associated therewith compensating drive means for differentially driving the driven axles. It will be noted that the compensating differential is located low enough to be lubricated from the housing of axle 13. Suitable openings may be provided to permit the lubricant to flow to casing 64 from housing of axle 13, if desired to lubricate both of the adjacent differentials from a common reservoir.

In Figures 5, 6 and 7 is illustrated a still further embodiment of my invention, which includes means associated with the axles for taking the torque on same as well as restraining them for movement within a fixed parallelogram with respect to the vehicle frame, as seen in plan whereby the necessity of torque tubes as well as the guide 48 is avoided. Short or stub trunnions may also be used in this form of the invention. In this form of the invention, each of the axles 12 and 13 has secured adjacent each end thereof a member 85 each of which includes a cylindrical portion 86 provided with a ball seat 87 which seats have detachably engaged therewith the two part ball hangers 88 for securing the opposite ends of springs 89 to axles 12 and 13 for universal movement relative thereto, the springs being pivoted relative to frame 11 and connected to wheels 14 and 15 substantially in the manner disclosed in the previous forms of the invention. Each member 85 further comprises an integral square block 91 provided with laterally disposed flanges 92 provided with arcuate faces 93. The blocks 91 are mounted for vertical reciprocation in vertical guide slots 94 provided by spaced vertical walls 95 of brackets 96, which may include, beside the walls 95, horizontal portions 97 for engagement with the under faces of frame 11, as well as inner oppositely disposed stiffening flanges 98 and similar outer oppositely disposed flanges 99, the latter flanges merging into portions 101 engaging and secured to the opposite outer walls of frame 11, the flanges 98 and 99 defining channels on opposite sides of slots 94 as is clearly disclosed in Figures 5 and 6. Walls 95 of each bracket 96 may be connected by spacers and bolts 101'. The adjacent faces of walls 95 are lined with molded brake lining 102 for engagement by the corresponding faces of blocks 91 for preventing noise and the inner faces of flanges 98 are provided with linings of molded brake lining 103 for engagement by the arcuate faces 93 on flanges 92 of blocks 91. By this construction axles 12 and 13 are permitted vertical oscillation, the arcuate surfaces 93 permitting angular movements of the axles vertically, the walls 95 restraining the axles against movement longitudinally of the frame and resisting the torque reactions. At the same time flanges 92 maintain the axles centrally of frame 11 and from lateral movement.

With this construction the torque tubes disclosed in the previous embodiments of the invention are not required and axles 12 and 13 in accordance with this embodiment of the invention are adapted to be driven by either of the forms of drives heretofore disclosed. The torque tube lateral movement resisting means is also not required, springs 89 being simply pivotally connected to stub axle trunnions 105 supported in brackets 106 secured to frame 11.

It will be seen that in accordance with this embodiment of the invention a multi-wheel tandem drive axle road vehicle is provided of relative simplicity and wherein the drive axles are maintained against transverse movement as well as in parallel relation in plan view without restricting the necessary movements thereof due to road irregularities encountered by the drive wheels.

What I claim is:

1. A multi-wheel road vehicle comprising a frame, a pair of drive axles arranged to support one end of said frame, springs interconnecting said frame and axles in a manner permitting free tilting of each axle with respect to said frame, a drive shaft extending between said axles and means vertically guiding said drive shaft to prevent movement of said frame relative to said axles in a direction endwise of said axles, said means permitting the axles to tilt and to bodily rise and fall as they move over road irregularities.

2. The combination defined in claim 1 in which said last named means comprises a non-circular block rotatively attached to said drive shaft, and a guideway for said block permitting it to slide vertically as the axles rise or fall.

3. A multi-wheel road vehicle comprising a frame, a pair of drive axles arranged to support one end of said frame, depending hangers secured to each of said drive axles by universal joints, springs interconnecting said frame and said hangers so that deflection of said springs is permitted without causing separational movement of said axles, means to resist the driving torque on the housings of said axles and means attached to said frame and vertically guiding said torque resisting means to prevent movement of said frame relative to said axles in a direction endwise of the axles, said last named means permitting the axles to tilt and to bodily rise and fall as they move over road irregularities.

4. The combination defined in claim 3 in which said springs are secured to said frame by means of a trunnion shaft extending transversely thereto and in which said last named means is supported by said trunnion shaft.

5. A multi-wheel road vehicle comprising a frame, a pair of drive axles arranged to support one end of said frame, a torque tube rigidly secured at one end to each of said axles and flexibly united to said frame or said other axle by means of universal joints whereby the axles are positioned endwise of said frame by said torque tubes, springs interconnecting said frame and axles in a manner permitting free tilting of each axle with respect to the frame and to permit the axles to bodily rise and fall as they move over road irregularities, a drive shaft extending between said axles through one of said torque tubes, and means engaging one of said torque tubes to prevent movement of said frame relative to said axles in a direction endwise of said axles, said means permitting the axles to move in all other directions permitted by their connections to said frame.

6. The combination defined in claim 5 in which the means associated with one of said torque tubes to prevent movement of the axles laterally of said frame comprises a non-circular block rotatably mounted on said tube and a frame arranged to vertically slidably receive said block, said last named frame being rigidly secured to the vehicle frame.

7. A multi-wheel road vehicle comprising a frame, a pair of axles arranged to support one end of said frame, spring hangers united adjacent each end of each axle to the axle by means of flexible joints and depending substantially below each axle, springs pivotally attached to said frame between their ends adjacent each side of said frame, and connected at their ends to one of said depending hangers, a torque tube rigidly secured adjacent one end to each axle and flexibly supported at its other end to position the axles endwise of the frame, and means secured to said frame and engaging one of said torque tubes to position the axles laterally of said frame, said last named means permitting the axles to partake relatively freely of all movement permitted by their connection to said frame except movement in a direction endwise of the axles.

8. The combination defined in claim 7 in which said springs are secured to a trunnion shaft extending transversely of said frame, and in which said last named means is supported by said shaft.

9. A multi-wheel road vehicle comprising a frame, a pair of drive axles arranged to support one end of said frame, a guide for each end of each of said drive axles, each of said guides providing a guideway extending substantially vertically with respect to said frame, non-circular blocks secured to each of said axles for movement in each of said guideways, said blocks being provided with means contacting with said guideways to restrict the movement of said axles in either direction laterally of said frame, a hanger secured to each end of each axle adjacent one of said guideways by a flexible joint, a spring secured to each side of said frame between said axles, each spring adjacent its end having a single pivotal connection with one of said hangers.

10. In a multiwheel vehicle, a frame; a pair of transverse axles arranged in tandem beneath one end of said frame; a wheel at each end of each axle; means for mounting the frame upon said axles, said means comprising suspension beams pivoted on the frame and universally connected to the axle ends; and means for preventing relative movement between the frame and the axles in a direction axially of the latter, said means comprising a frame-supported guide adjacent at least one end of each axle, and a corresponding cooperating means carried on the axle end to slidably engage said guide.

11. In the apparatus defined in claim 10, said preventing means being designed to position the axles longitudinally of the frame and adapted to resist any torque reactions of the axles during vehicle operation.

12. In a multi-wheel road vehicle, a frame; tandem axles disposed beneath one end of said frame; springs pivotally supporting said frame between their ends; and having their ends supported by said axles; means constraining said axles to move upwardly and downwardly in defined paths during operation; means positively preventing any movement of said axles substantially laterally of said frame, said means being designed to permit free tilting movement of the axles; and connections between said axles and said spring ends, permitting the axles to tilt without restriction, and to rise and fall without restricting deflection of the springs.

13. In a multi-wheel vehicle construction, a chassis frame; a pair of tandem axles disposed beneath one end of said frame; a suspension system for mounting said end of the frame upon said axles; and mechanism for preventing any transverse movement of said frame relative to at least one of said axles; said mechanism comprising rigid frame-supported guide means providing vertical walls in laterally spaced planes extending longitudinally of the frame, a lining of different material than said guide walls, fixed on each vertical wall; and means connected to said one axle immovable relative thereto in an endwise direction and in slidable engagement with the linings of said vertical walls.

14. A multi-wheel road vehicle comprising a frame; a pair of axles arranged to support one end of said frame; means to constrain each of said axles to move substantially vertically, said constraining means comprising guideways attached to the frame and slidable means connected to the axles for cooperation with the guideways, said slidable means being designed to resist the torque tending to rotate the axle housings about the axes of the axles, whereby the torque reactions are transmitted to said guideways; springs pivoted to said frame between their ends, and means for supporting the spring ends from the axles, said supporting means being designed to permit the axles to individually tilt and to bodily rise and fall as they move over road irregularities without causing twisting of said springs while permitting said springs to freely deflect, said springs being arranged to distribute the load on said axles without regard to their vertical position.

15. A multi-wheel road vehicle comprising a frame; a pair of axles arranged to support one end of said frame; means to constrain each of said axles to move substantially vertically, said constraining means comprising devices connected to the axles and cooperating with guideways secured to said frame to position the axles laterally with respect to said frame without substantially interfering with the operating movement of said axles; springs pivoted to said frame between their ends, and means for supporting the spring ends from the axles, said supporting means being designed to permit the axles to individually tilt and to bodily rise and fall as they move over road irregularities without causing twisting of said springs while permitting said springs to freely deflect, said springs being arranged to distribute the load on said axles without regard to their vertical position.

16. A multi-wheel road vehicle comprising a frame, a pair of axles arranged adjacent one end of said frame, a non-circular member secured adjacent each end of each axle, guideways depending from said frame to slidably engage said non-circular members to guide the axles in substantially vertical planes, spring hangers secured to each end of each axle adjacent one of said members, said hangers depending substantially below said axles, springs pivoted between their ends to said frame adjacent each side thereof, an end of each of said springs being supported by one of said hangers in a manner permitting deflection of said springs during operation, each of said non-circular members being provided with an abutment contacting with a side of one of said guides, so as to prevent lateral movement of the axles relative to the frame, each of said abutments being shaped to permit the axles to freely tilt as the vehicle passes over road irregularities.

ROLLIE B. FAGEOL.